Patented May 19, 1931

1,806,576

UNITED STATES PATENT OFFICE

JULIAN S. COHEN, OF NEW YORK, N. Y.

FOOD PRODUCT

No Drawing.　　　Application filed April 25, 1928.　Serial No. 272,864.

This invention relates to a food product or composition, and particularly to a composition which may be utilized for making meringues, marshmallows or such like products as are generally used in cake, pastry or candy manufacture.

The object of this invention is to provide a composition whose ingredients are comparatively inexpensive and readily securable, yet which will produce a finished food product of high quality and of many uses.

In carrying out my invention I utilize a mixture composed of albumen in either liquid or dry form, although preferably in dry or powdered form; sugar, and a moderate percentage of ground, powdered or pulverized kernel or seed of St. John's bread or lotus bean. The latter ingredient, powdered St. John's bread kernels or seeds, is found particularly effective since in the combination of ingredients mentioned, it lends its highly absorptive qualities. The extraordinary absorptive qualities of the kernel or seed of St. John's bread or lotus bean tend to so reduce the liquid content of the meringue or marshmallow mixture, that such mixture is normally maintained in the proper consistency for an extremely long length of time.

It is well known that when dry albumen is used to form a whip for meringues, marshmallows or the like, it is necessary to add considerable water to the mix. For instance, a pint of water is generally added to 2½ ounces of the albumen preparation and also 1½ pounds of sugar. This produces a temporarily satisfactory whip, but one which after standing less than forty hours becomes partly fluid and therefore useless.

I am aware that various efforts have been made to stabilize the mixture thus made, such as by adding a jelly-creating compound like a mixture of pectin and a fruit acid. While the addition of such ingredients will produce a resultant food product which is stable by reason of its jelly formation, I am aware that the use of such ingredients has not proven entirely satisfactory for several reasons. In the first place the use of a citric acid, which is necessarily used where pectin is used, gives a slightly sour or "tart" taste, which is sometimes undesirable. Secondly, where pectin is used the mixture is rendered "pasty" or sticky, which condition is particularly present under certain atmospheric conditions and is sometimes objected to.

My invention therefore has for its primary object, the production of a meringue, marshmallow or like food product of a non-jelly formation which will have initially and retain indefinitely the consistency or degree of solidity required of such food product without having the acid taste created by the use of an acid in the mixture; without also having the pasty consistency produced through the use of pectin. I also achieve through the use of my improved food product a mixture which is highly stable, thus avoiding the tendency of the mixture to rapidly become fluid after a short time.

I have found that a commercial form of mixture may be readily made and supplied to users, such mixture consisting of a proportion of dried egg or albumen, powdered or finely divided kernel of St. John's bread or lotus bean, and sugar. If desired, where a slightly "tart" taste is required, a small percentage of a citric acid may be added, although such addition of acid is not at all essential to the complete success of the mixture.

One embodiment of my improved food composition may be as follows:

| | Per cent |
|---|---|
| Dried egg albumen | 20 |
| Sugar | 73 |
| Finely divided or pulverized kernel of St. John's bread or lotus bean | 7 |

It will be understood that where required, other ingredients may be added, particularly where variations in the taste of the resultant product are required. The mixture, which is formed in a whip through the customary application of cold water and beating process, results in a product of a continuously uniform consistency under varying degrees of temperature. This is due to the highly absorptive powers of the powdered kernel of St. John's bread or lotus bean, which rapidly absorbs excess water so that the possibility of the mixture becoming fluid or partly fluid is prevented, even though the whip should stand for many hours. The resultant whip is therefore one which is of the desired consistency constantly; which has not the sticky, pasty character of a mixture created by the inclusion of pectin or other jelly-forming ingredients; and which where a "tart" taste is not desired, can dispense with the inclusion of citric acid without in any manner affecting the result.

While I have described one embodiment of my invention, it is obvious that the same is not to be restricted thereto, but is broad enough to cover all compositions coming within the scope of the annexed claims.

What I claim is:

1. A food product for use in making meringues, marshmallows and the like comprising albumen, sugar and the kernel of St. John's bread.

2. A food composition for use in making meringues, comprising egg albumen and a preparation of finely divided seed or kernel of St. John's bread and sugar, said ingredients being in the proportions necessary to form, with the addition of water, a whip of suitable consistency.

Signed at the city, county and State of New York, this 21st day of April, 1928.

JULIAN S. COHEN.